US010456712B2

(12) United States Patent
Morgan (10) Patent No.: US 10,456,712 B2
(45) Date of Patent: Oct. 29, 2019

(54) RECOVERING A HYDROCARBON FLUID (71) Applicant: R3 Oil, LLC, San Antonio, TX (US)

(72) Inventor: Milton Morgan, Crystal City, TX (US)

(73) Assignee: R3 Oil, LLC, San Antonio, TX (US)

( * ) Notice: Subject to any disclaimer, the term of this patent is extended or adjusted under 35 U.S.C. 154(b) by 0 days.

(21) Appl. No.: 16/432,616

(22) Filed: Jun. 5, 2019

(65) Prior Publication Data
US 2019/0282927 A1    Sep. 19, 2019

Related U.S. Application Data (62) Division of application No. 14/858,506, filed on Sep. 18, 2015, now Pat. No. 10,343,087.

(51) Int. Cl.
| *B01D 17/02* | (2006.01) |
| *B01D 17/04* | (2006.01) |
| *B01D 17/12* | (2006.01) |
| *B01D 21/30* | (2006.01) |
| *B01D 21/34* | (2006.01) |
| *B01D 21/00* | (2006.01) |

(52) U.S. Cl.
CPC ......... *B01D 17/0214* (2013.01); *B01D 17/04* (2013.01); *B01D 17/12* (2013.01); *B01D 21/0018* (2013.01); *B01D 21/302* (2013.01); *B01D 21/34* (2013.01); *B01D 21/307* (2013.01)

(58) Field of Classification Search
CPC ............ B01D 17/0214; B01D 21/0018; B01D 21/0012; B01D 21/34; B01D 21/302; B01D 17/04; B01D 17/12; B01D 17/02; E21B 41/00
See application file for complete search history.

(56) References Cited

U.S. PATENT DOCUMENTS

| 4,428,839 | A | 1/1984 | Davies |
| 5,484,023 | A | 1/1996 | Shippee |
| 6,035,952 | A | 3/2000 | Bradfield |
| 6,657,440 | B1 | 12/2003 | Amini |
| 7,311,001 | B2 | 12/2007 | Liu |
| 8,794,063 | B2 | 8/2014 | Miskell |
| 2006/0254777 | A1 | 11/2006 | Wynn |
| 2008/0034847 | A1 | 2/2008 | Golter |
| 2008/0105616 | A1 | 5/2008 | Allouche |

(Continued)

FOREIGN PATENT DOCUMENTS

WO    WO2016069644 A1    5/2016

*Primary Examiner* — Walter D. Griffin
*Assistant Examiner* — Cameron J Allen
(74) *Attorney, Agent, or Firm* — Fish & Richardson P.C.

(57) ABSTRACT

Techniques for recovering a hydrocarbon fluid from a waste fluid include transmitting a plurality of wave energy pulses through a waste fluid, the waste fluid including a mixture of a hydrocarbon fluid and a non-hydrocarbon fluid; receiving a plurality of reflected wave energy pulses transmitted through the waste fluid; determining a level difference between a surface of a hydrocarbon fluid layer that includes the hydrocarbon fluid and a surface of a non-hydrocarbon fluid layer that includes a non-hydrocarbon fluid based, at least in part, on the plurality of reflected wave energy pulses; and operating a hydrocarbon fluid pumping assembly, based on the determined level difference, to circulate a portion of the hydrocarbon fluid in the hydrocarbon fluid layer from the waste fluid.

20 Claims, 7 Drawing Sheets

(56) References Cited

U.S. PATENT DOCUMENTS

| | | |
|---|---|---|
| 2011/0132815 A1 | 6/2011 | Angelilli |
| 2013/0334142 A1* | 12/2013 | Janjua ................ B01D 17/0214 210/708 |
| 2014/0066668 A1 | 3/2014 | Lorenz |
| 2015/0247836 A1 | 9/2015 | Szymkowiak |
| 2016/0031731 A1 | 2/2016 | Holland |
| 2016/0122209 A1 | 5/2016 | Newman |
| 2017/0080359 A1 | 3/2017 | Morgan |

* cited by examiner

RECOVERING A HYDROCARBON FLUID

CROSS-REFERENCE TO RELATED APPLICATION

This application is a divisional of and claims priority to U.S. patent application Ser. No. 14/858,506, filed on Sep. 18, 2015, and entitled "Recovering a Hydrocarbon Fluid," the entire contents of which are incorporated by reference herein.

TECHNICAL FIELD

This document relates to systems and methods for recovering a hydrocarbon fluid, such as recovering oil from a water-oil mixture.

BACKGROUND

Waste fluid in hydrocarbon fluid production systems, such as used fracturing fluid, often contains trace amounts of hydrocarbons, such as oil. The recovery of such hydrocarbons may occur, typically, at great cost and energy usage. For example, gun barrel tanks, or settling tanks, may be used for separating oil and non-hydrocarbons by gravity segregation forces. In some aspects, oil at the top of the tank may be skimmed off, however, such oil often contains an unacceptable amount of water and non-hydrocarbons. Further, heating and pumping systems used in gun barrel tanks may further separate the oil and non-hydrocarbons through the addition of great amounts of heat (and thus energy) to the liquids in the tank. Still, the remaining oil in the tank, even after heat separation, may contain an unacceptable amount of water.

SUMMARY

In an example implementation, a hydrocarbon recovery system includes a sensor assembly including a sensor antenna configured to transmit a plurality of wave energy pulses through a waste fluid in a direction away from the sensor antenna, the waste fluid including a mixture of a hydrocarbon fluid and a non-hydrocarbon fluid, the sensor antenna further configured to receive a plurality of reflected wave energy pulses transmitted through the waste fluid in a direction toward the sensor antenna, the sensor assembly further configured to determine a level difference between a surface of a hydrocarbon fluid layer that includes the hydrocarbon fluid and a surface of a non-hydrocarbon fluid layer that includes a non-hydrocarbon fluid based, at least in part, on the plurality of reflected wave energy pulses, and generate a signal based on the determined level difference; and a hydrocarbon fluid pumping assembly communicably coupled to the sensor assembly to receive the generated signal, the hydrocarbon fluid pumping assembly configured to operate, based at least in part on the generated signal, to circulate a portion of the hydrocarbon fluid in the hydrocarbon fluid layer from the waste fluid.

In a first aspect combinable with the example implementation, the sensor antenna includes a radar rod antenna.

In a second aspect combinable with any of the previous aspects, the plurality of wave energy pulses include ultrasonic energy and electromagnetic energy.

In a third aspect combinable with any of the previous aspects, the radar rod antenna is configured to transmit the ultrasonic energy through the plurality of wave energy pulses and into the waste fluid to at least partially separate the hydrocarbon fluid into the hydrocarbon fluid layer and the non-hydrocarbon fluid into the non-hydrocarbon fluid layer of the waste fluid.

In a fourth aspect combinable with any of the previous aspects, the radar rod antenna is further configured to transmit the ultrasonic energy through the plurality of wave energy pulses and into the waste fluid to at least partially separate a plurality of particulates in the waste fluid into a sludge layer separate from the hydrocarbon fluid and non-hydrocarbon fluid layers.

In a fifth aspect combinable with any of the previous aspects, the sensor assembly is configured to determine: (i) a distance between the surface of the hydrocarbon fluid layer and the sensor antenna based, at least in part, on a travel time of the plurality of wave energy pulses and the plurality of reflected wave energy pulses between the sensor antenna and the surface of the hydrocarbon fluid layer, and (ii) a distance between the surface of the non-hydrocarbon fluid layer and the sensor antenna based, at least in part, on a travel time of the plurality of wave energy pulses and the plurality of reflected wave energy pulses between the sensor antenna and the surface of the non-hydrocarbon fluid layer.

In a sixth aspect combinable with any of the previous aspects, the sensor assembly is further configured to determine the level distance based at least in part on a difference between the distance between the surface of the hydrocarbon fluid layer and the sensor antenna and the distance between the surface of the non-hydrocarbon fluid layer and the sensor antenna.

In a seventh aspect combinable with any of the previous aspects, the sensor assembly is further configured to generate the signal based on the determined level difference exceeding a threshold level difference.

In an eighth aspect combinable with any of the previous aspects, the hydrocarbon fluid pumping assembly includes a diaphragm pump positionable to circulate the portion of the hydrocarbon fluid in the hydrocarbon fluid layer from the waste fluid based at least in part on the generated signal from the sensor assembly.

In a ninth aspect combinable with any of the previous aspects, the hydrocarbon fluid pumping assembly includes an inlet conduit that includes an inlet submergible in the hydrocarbon fluid layer; a strainer positioned on the inlet to filter one or more particulates from hydrocarbon fluid in the hydrocarbon fluid layer; and a float coupled to the strainer and configured to ride on the surface of the hydrocarbon fluid layer to maintain a position of the inlet within the hydrocarbon fluid layer.

In a tenth aspect combinable with any of the previous aspects, the hydrocarbon fluid includes oil and the non-hydrocarbon fluid includes water.

In an eleventh aspect combinable with any of the previous aspects, the portion of the hydrocarbon fluid includes oil that includes 1% or less of water by volume.

In a twelfth aspect combinable with any of the previous aspects, the waste fluid includes a hydraulic fracturing fluid recovered from a hydraulic fracturing operation.

In another example implementation, a method for recovering a hydrocarbon fluid from a waste fluid includes transmitting a plurality of wave energy pulses through a waste fluid, the waste fluid including a mixture of a hydrocarbon fluid and a non-hydrocarbon fluid; receiving a plurality of reflected wave energy pulses transmitted through the waste fluid; determining a level difference between a surface of a hydrocarbon fluid layer that includes the hydrocarbon fluid and a surface of a non-hydrocarbon fluid layer that includes a non-hydrocarbon fluid based, at least in part, on the plurality of reflected wave energy pulses; and operating a hydrocarbon fluid pumping assembly, based on the determined level difference, to circulate a portion of the hydrocarbon fluid in the hydrocarbon fluid layer from the waste fluid.

In a first aspect combinable with the example implementation, transmitting the plurality of wave energy pulses includes transmitting ultrasonic energy and electromagnetic energy into the waste fluid.

A second aspect combinable with any of the previous aspects further includes at least partially separating the hydrocarbon fluid into the hydrocarbon fluid layer and the non-hydrocarbon fluid into the non-hydrocarbon fluid layer of the waste fluid based at least in part on transmitting the ultrasonic energy into the waste fluid.

A third aspect combinable with any of the previous aspects further includes at least partially separating a plurality of particulates in the waste fluid into a sludge layer separate from the hydrocarbon fluid and non-hydrocarbon fluid layers based at least in part on transmitting the ultrasonic energy into the waste fluid.

A fourth aspect combinable with any of the previous aspects further includes determining a distance between the surface of the hydrocarbon fluid layer and a source of the plurality of wave energy pulses based, at least in part, on a travel time of the plurality of wave energy pulses and the plurality of reflected wave energy pulses between the source and the surface of the hydrocarbon fluid layer; and determining a distance between the surface of the non-hydrocarbon fluid layer and the source based, at least in part, on a travel time of the plurality of wave energy pulses and the plurality of reflected wave energy pulses between the source and the surface of the non-hydrocarbon fluid layer.

A fifth aspect combinable with any of the previous aspects further includes determining the level distance based at least in part on a difference between the distance between the surface of the hydrocarbon fluid layer and the source and the distance between the surface of the non-hydrocarbon fluid layer and the source.

A sixth aspect combinable with any of the previous aspects further includes generating a signal based on the determined level difference that exceeds a threshold level difference; and transmitting the signal to the hydrocarbon fluid pumping assembly to operate the hydrocarbon fluid pumping assembly.

A seventh aspect combinable with any of the previous aspects further includes opening a valve fluidly coupled to a hydraulic fluid supply based on the generated signal; and providing the hydraulic fluid supply to a diaphragm pump of the hydrocarbon fluid pumping assembly; and circulating, with the diaphragm pump, the portion of the hydrocarbon fluid in the hydrocarbon fluid layer from the waste fluid.

In an eighth aspect combinable with any of the previous aspects, the hydrocarbon fluid pumping assembly includes an inlet conduit with an inlet, the method further including maintaining a position of the inlet submerged in the hydrocarbon fluid layer based, at least in part, on the surface of the hydrocarbon fluid layer.

In a ninth aspect combinable with any of the previous aspects, the hydrocarbon fluid includes oil and the non-hydrocarbon fluid includes water.

In a tenth aspect combinable with any of the previous aspects, the portion of the hydrocarbon fluid includes oil that includes 1% or less of water by volume.

In an eleventh aspect combinable with any of the previous aspects, the waste fluid includes a hydraulic fracturing fluid recovered from a hydraulic fracturing operation.

In another example implementation, an oil recovery system includes a plurality of oil recovery sub-assemblies, each oil recovery sub-assembly including: a radar rod antenna configured to transmit a plurality of wave energy pulses through a recovered hydraulic fracturing liquid that is stored in a recovery tank in a direction away from the radar rod antenna, the recovered hydraulic fracturing liquid including a mixture of oil and water, the radar rod antenna further configured to receive a plurality of reflected wave energy pulses transmitted through the recovered hydraulic fracturing liquid in a direction toward the radar rod antenna; and a pumping assembly positioned to circulate a portion of the oil from the recovered hydraulic fracturing liquid. The system also includes a control system communicably coupled to each of the plurality of oil recovery sub-assemblies, the control system configured to perform, for each of the plurality of oil recovery sub-assemblies, operations including: determining, based on the plurality of wave energy pulses and the plurality of reflected wave energy pulses, a level difference between a surface of an oil layer that includes the oil and a surface of a water layer that includes the water; and controlling the pumping assembly to circulate the portion of the oil from the recovered hydraulic fracturing liquid based on the determined level difference.

In a first aspect combinable with the example implementation, the plurality of wave energy pulses include ultrasonic energy and electromagnetic energy.

In a second aspect combinable with any of the previous aspects, the radar rod antenna is configured to transmit the ultrasonic energy through the plurality of wave energy pulses and into the recovered hydraulic fracturing liquid to at least partially separate the oil into the oil layer and the water into the water layer of the recovered hydraulic fracturing liquid.

In a third aspect combinable with any of the previous aspects, the radar rod antenna is further configured to transmit the ultrasonic energy through the plurality of wave energy pulses and into the recovered hydraulic fracturing liquid to at least partially separate a plurality of particulates of the recovered hydraulic fracturing fluid into a sludge layer separate from the oil and water layers.

In a fourth aspect combinable with any of the previous aspects, the control system is further configured to, for each of the plurality of oil recovery sub-assemblies, perform operations including determining a distance between the surface of the oil layer and the radar rod antenna based, at least in part, on a travel time of the plurality of wave energy pulses and the plurality of reflected wave energy pulses between the radar rod antenna and the surface of the oil layer; and determining a distance between the surface of the water layer and the radar rod antenna based, at least in part, on a travel time of the plurality of wave energy pulses and the plurality of reflected wave energy pulses between the radar rod antenna and the surface of the water layer.

In a fifth aspect combinable with any of the previous aspects, the portion of the oil includes oil that includes 1% or less of water by volume.

Various implementations of a hydrocarbon fluid recovery system may include one, some, or all of the following features. For example, the hydrocarbon fluid recovery system may recover oil from spent fracturing fluid that has less water (less than 1% by volume) therein as compared to conventional systems. As another example, the hydrocarbon fluid recovery system may use significantly less energy (e.g., heat or electricity) to recover oil as compared to conventional systems. As yet another example, the hydrocarbon fluid recovery system may only require low voltage AC power (e.g., 115-120 VAC) to operate, as compared to higher voltage power or a natural gas or propane supply. Further, the hydrocarbon fluid recovery system may have substantial environmental and fossil fuel conservation benefits as compared to conventional systems, as detailed herein.

The details of one or more embodiments are set forth in the accompanying drawings and the description below. Other features, objects, and advantages will be apparent from the description and drawings, and from the claims.

DETAILED DESCRIPTION

This disclosure describes example implementations of a hydrocarbon fluid recovery system that separates and pumps a hydrocarbon fluid from a waste fluid, such as recovered hydraulic fracturing fluid. In some aspects, the hydrocarbon fluid recovery system may include an energy wave generator that transmits energy pulses (e.g., ultrasonic and electromagnetic energy) through a waste fluid to agitate and stratify the waste fluid into at least a hydrocarbon fluid layer and a non-hydrocarbon fluid layer. As a level difference between the hydrocarbon fluid layer and the non-hydrocarbon fluid layer meets a particular threshold, as determined based on energy pulses reflected back to the energy wave generator, a pumping system removes the hydrocarbon fluid from the waste fluid independent of the non-hydrocarbon fluid or other substances (e.g., particulates) within the waste fluid. In some aspects, the removed hydrocarbon fluid may include 1% or less of non-hydrocarbon fluid (e.g., water) by volume.

The example implementations of the hydrocarbon fluid recovery systems described in the present disclosure may include one or more environmental benefits that materially enhance the quality of the environment of mankind by contributing to the restoration or maintenance of the basic life-sustaining natural elements, e.g., air, water, and soil. For example, implementations of the hydrocarbon fluid recovery systems described in the present disclosure may allow for the substantial reuse of non-hydrocarbon fluid (e.g., water) in hydraulic fracturing operations by separating the water from hydrocarbon fluid stored in a mixed state (e.g., along with particulates, sludge, and other material) in a fracturing fluid disposal container (e.g., tank, pond, or otherwise). The water may then be reused in subsequent fracturing operations. By reusing the separated water, subsequent fracturing operations may not require a new or fresh source of water, thereby saving water supplies for human, animal, or agricultural consumption.

As another example, implementations of the hydrocarbon fluid recovery systems described in the present disclosure may allow for the decreased use of disposal wells in the hydrocarbon recovery industry. Typically, a disposal well is a newly or previously drilled well into which waste fluids (e.g., mixed hydrocarbon and non-hydrocarbon fluids stored in a fracturing fluid disposal container) can be injected for safe disposal. Disposal wells typically are subject to regulatory requirements to avoid the contamination of freshwater aquifers by the waste fluids. Thus, as a total volume of waste fluid is decreased (e.g., through the use of the hydrocarbon recovery systems described herein), a number of disposal wells is reduced, which may decrease a chance of aquifer contamination. In addition, to the extent that disposal wells may cause or contribute to a cause of seismic events (e.g., earthquakes or otherwise), a reduction in disposal wells may also reduce a chance of such seismic events in geographic areas into which disposal wells are drilled and used.

Moreover, implementations of the hydrocarbon fluid recovery systems described in the present disclosure may materially contribute to a more efficient utilization and conservation of energy resources, such as fossil fuels (e.g., oil and other petroleum). For example, use of the hydrocarbon fluid recovery systems described herein may introduce more usable oil (and possibly other hydrocarbons) into the market for sale and consumption. In some aspects, the usable oil recovered by the hydrocarbon fluid recovery systems described herein may be oil that includes less than 1% water. The usable oil that meets this criteria may be placed in a pipeline for sale and/or consumption. As more usable oil is available in the global marketplace, additional drilling may be superfluous, thereby increasing an overall efficiency of drilling (e.g., total volume of recovered hydrocarbons relative to total drilled feet of production wells).

Figure 1:
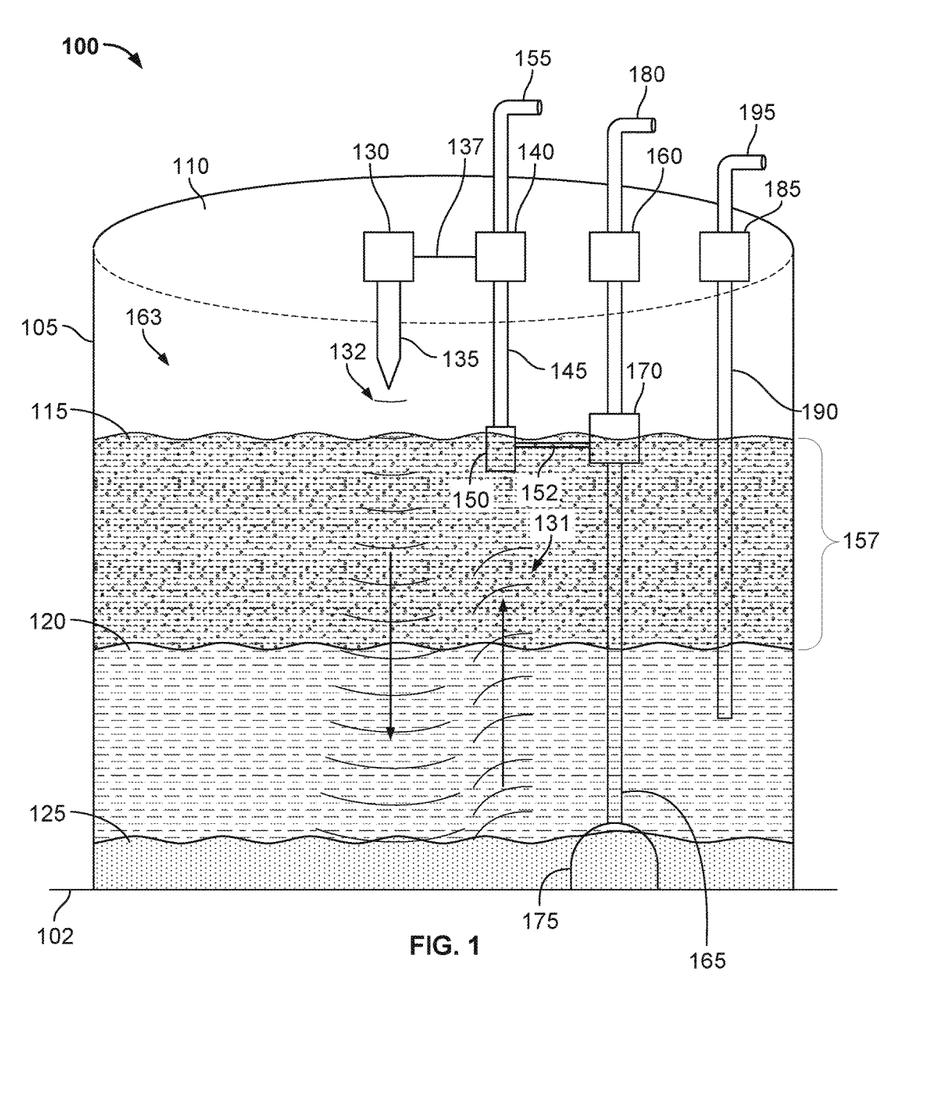
FIG. 1 illustrates a schematic view of an example implementation of a hydrocarbon fluid recovery system.

FIG. 1 illustrates a schematic view of an example implementation of a hydrocarbon fluid recovery system 100. As shown in FIG. 1, the illustrated system 100 includes a waste fluid container 105 positioned on a terranean surface 102. The waste fluid container 105, in this example, includes a top 110 that encloses one or more fluids (115, 120, and 125) within the container 105 in a mixed, semi-mixed, or separated (e.g., stratified) state. Although the waste fluid container 105 is shown as a cylindrical container sitting on the terranean surface 102, the waste fluid container 105 may be any appropriate enclosure to hold and store waste fluids, at any appropriate location (e.g., underground, above ground, floating on a natural body of water, underwater, or otherwise). For example, in some aspects, waste fluid container 105 may be a man-made pond or other formed container that can hold and store waste fluids (whether enclosed by a top surface or otherwise).

In this particular example implementation, waste fluid enclosed within the waste fluid container 105 may be or include a used hydraulically fracturing fluid, e.g., a fluid (e.g., liquid or mixed-phase fluid) that includes a combination of water and chemicals, as well as proppant (sand) when necessary to perform a fracturing operation of an underground geologic formation (e.g., shale, sandstone, or otherwise).

As illustrated in this example, the waste fluid enclosed within the waste fluid container 105 includes three fluids, which may be in a mixed, semi-mixed, or stratified state. For example, the waste fluid may include a hydrocarbon fluid 115 (e.g., oil), a non-hydrocarbon fluid 120 (e.g., water), and a sludge 125 (e.g., mixture of hydrocarbon fluid, non-hydrocarbon fluid, and particulates). In some aspects, the sludge 125 may primarily consist of particulates (e.g., sand used as proppant, fines, bits of drilled geologic formation, and otherwise).

In some aspects, as shown, the waste fluid may be naturally stratified to some degree (e.g., not completely stratified) due to, for example, differences in density (or specific gravity or otherwise) between the hydrocarbon fluid 115, the non-hydrocarbon fluid 120, and the sludge 125. For example, as shown, the hydrocarbon fluid 115 may be less dense than the non-hydrocarbon fluid 120, which may be less dense than the sludge 125. Thus, over time, the sludge 125 may settle to a bottom of the waste fluid container 105, the non-hydrocarbon fluid 120 may settle on top of the sludge 125, and the hydrocarbon fluid 115 may settle on top of the non-hydrocarbon fluid 120. However, at each fluidic interface of fluids, there may be a mixture of the interfacing fluids (e.g., mixture of hydrocarbon fluid 115 and non-hydrocarbon fluid 120 at the fluidic interface between the hydrocarbon fluid 115 and non-hydrocarbon fluid 120). The fluidic interface, e.g., between the hydrocarbon fluid 115 and non-hydrocarbon fluid 120, may be less than an inch thick to several inches thick).

The illustrated hydrocarbon fluid recovery system 100 includes a sensor sub-assembly 130 that, in this example, is positioned on the top 110 of the container and includes a sensor antenna 135 that extends into a top of an interior volume 163 of the container 105. As described more fully with reference to FIGS. 2A-2B, the sensor sub-assembly 130 operates the sensor antenna 135 to transmit energy waves 132 through the interior volume 163 of the waste fluid container 105, e.g., from the top of the interior volume 163 toward the bottom of the interior volume 163. The energy waves 132 travel through, e.g., the hydrocarbon fluid 115, the non-hydrocarbon fluid 120, and the sludge 125, and is reflected by one or more of the fluids 115, 120, and 125 back toward the sensor antenna 135 as reflected wave energy 131.

In some aspects, the sensor antenna 135 is a radar rod antenna (e.g., model R3-50C series radar sensor made by The Madison Co. of Branford, Conn.). As such, the energy waves 132 may comprise ultrasonic/electromagnetic pulses transmitted from the antenna 135 through the interior volume 163 of the container 105. In some aspects, the ultrasonic energy agitates the waste fluids in the container 105, acting to further separate, e.g., the hydrocarbon fluid 115 (oil) from the non-hydrocarbon fluid 120 (water), and the particulates (sand, heavy metals) in the sludge 125 from the hydrocarbon fluid 115 and the non-hydrocarbon fluid 120. Thus, the ultrasonic energy may further stratify the different fluids in the container 105 beyond any natural stratification (e.g., due to relative density or specific gravity differences in the fluids).

In some aspects, the electromagnetic energy of the energy waves 132 is reflected (as reflected energy 131) from inter-facial surfaces that divide the different fluids in the container 105. For example, certain wavelengths of the electromagnetic energy reflect back toward the sensor antenna 135 from a top surface of the hydrocarbon fluid 115. Other wavelengths of the electromagnetic energy reflect from a top surface of the non-hydrocarbon fluid 120 (e.g., at the interface of the non-hydrocarbon fluid 120 and the hydrocarbon fluid 115). Other wavelengths of the electromagnetic energy reflect from a top surface of the sludge 125 (e.g., at the interface of the non-hydrocarbon fluid 120 and the sludge 125). As the reflected energy 131 is received at the sensor antenna 135, a relative level of each of the fluids within the waste fluid container 105 (e.g., the hydrocarbon fluid 115, the non-hydrocarbon fluid 120, and the sludge 125) may be determined. For example, the sensor antenna 135 may determine a travel time of the electromagnetic energy (in the energy waves 132 and reflected energy 131) and, based on a portion of the travel time (e.g., half of the travel time), a travel distance from the sensor antenna 135 to each top surface of the waste fluids (e.g., the hydrocarbon fluid 115, the non-hydrocarbon fluid 120, and the sludge 125) is determined. Thus, the relative level within the waste container 105 of each of the hydrocarbon fluid 115, the non-hydrocarbon fluid 120, and the sludge 125 may be determined. Based on the determined relative levels, as explained more fully herein, the sensor sub-assembly 130 may send a control signal 137 to a hydrocarbon fluid pumping assembly 140 to operate (e.g., turn on, turn off, speed up, slow down, or otherwise).

The illustrated hydrocarbon fluid pumping assembly 140 is also mounted on or near the top 110 of the container 105. An inlet conduit 145 (e.g., metallic, PVC, or otherwise) is coupled to a suction side of the hydrocarbon fluid pumping assembly 140, while an outlet conduit 155 (e.g., metallic, PVC, or otherwise) is fluidly coupled to a discharge side of the assembly 140. Although not shown in FIG. 1, the outlet conduit 155 may be coupled to another tank, a pipeline, or other hydrocarbon fluid container to receive hydrocarbon fluid 115 from the waste fluid container 105.

As shown, a strainer 150 is coupled to the inlet conduit 145 and is positioned within the hydrocarbon fluid 115. The strainer 150, in some aspects, may further separate the non-hydrocarbon fluid 120 and the sludge 125 from the hydrocarbon fluid 115 as the hydrocarbon fluid 115 is circulated into the inlet conduit 145 (e.g., by the hydrocarbon fluid pumping assembly 140).

In some aspects, the strainer 150 is coupled to a float 170 that is connected to a sludge pumping assembly 160 and the inlet conduit 145 may be a variable length inlet conduit (e.g., flexible, extendible, or otherwise). Thus, the strainer 150 may remain just submerged within the hydrocarbon fluid 115 as the top surface of the hydrocarbon fluid 115 (and thus the float 17) vertically adjusts within the container 105.

The hydrocarbon fluid recovery system 100 shown in FIG. 1 also includes the sludge pumping assembly 160, which is also mounted on or near the top 110 of the container 105. An inlet conduit 165 (e.g., metallic, PVC, or otherwise) is coupled to a suction side of the sludge pumping assembly 160, while an outlet conduit 180 (e.g., metallic, PVC, or otherwise) is fluidly coupled to a discharge side of the assembly 160. Although not shown in FIG. 1, the outlet conduit 180 may be coupled to another tank or container to receive the sludge 125 from the waste fluid container 105.

As shown, a strainer 175 is coupled to the inlet conduit 165 and is positioned at a bottom of the waste container 105. In some aspects, the strainer 175 may prevent large particulates (e.g., rock, heavy metals, sand, or otherwise) from being circulated through the inlet conduit 165 along with fluids or smaller particulates in the sludge 125.

As previously mentioned, the float 170 is positioned on the inlet conduit 165 and may ride (e.g., vertically) on the inlet conduit 165 as the top surface of the hydrocarbon fluid 115 is adjusted (e.g., due to operation of the hydrocarbon fluid pumping assembly 140). As shown, the float 170 is connected to the strainer 150 so as to maintain a position of the strainer 150 submerged within the hydrocarbon fluid 115 as the float 170 rides up and down on the inlet conduit 165.

The hydrocarbon fluid recovery system 100 shown in FIG. 1 also includes a non-hydrocarbon fluid pumping assembly 185, which is also mounted on or near the top 110 of the container 105. An inlet conduit 190 (e.g., metallic, PVC, or otherwise) is coupled to a suction side of the non-hydrocarbon fluid pumping assembly 185, while an outlet conduit 195 (e.g., metallic, PVC, or otherwise) is fluidly coupled to a discharge side of the assembly 185. In some aspects, the inlet conduit 190 may be sized to extend into the waste fluid container 105 to a position beneath a likely top surface of the non-hydrocarbon fluid 120. Thus, the non-hydrocarbon fluid pumping assembly 185 may generally pump the non-hydrocarbon fluid 120 out of the container 105. In alternative aspects, the non-hydrocarbon fluid pumping assembly 185 may not be a part of the hydrocarbon fluid recovery system 100 and, instead, an adjustable outlet (e.g., spigot or otherwise) may be mounted on the container 105 at a position to remove the non-hydrocarbon fluid 120 from the container 105 when open.

Figure 2A:
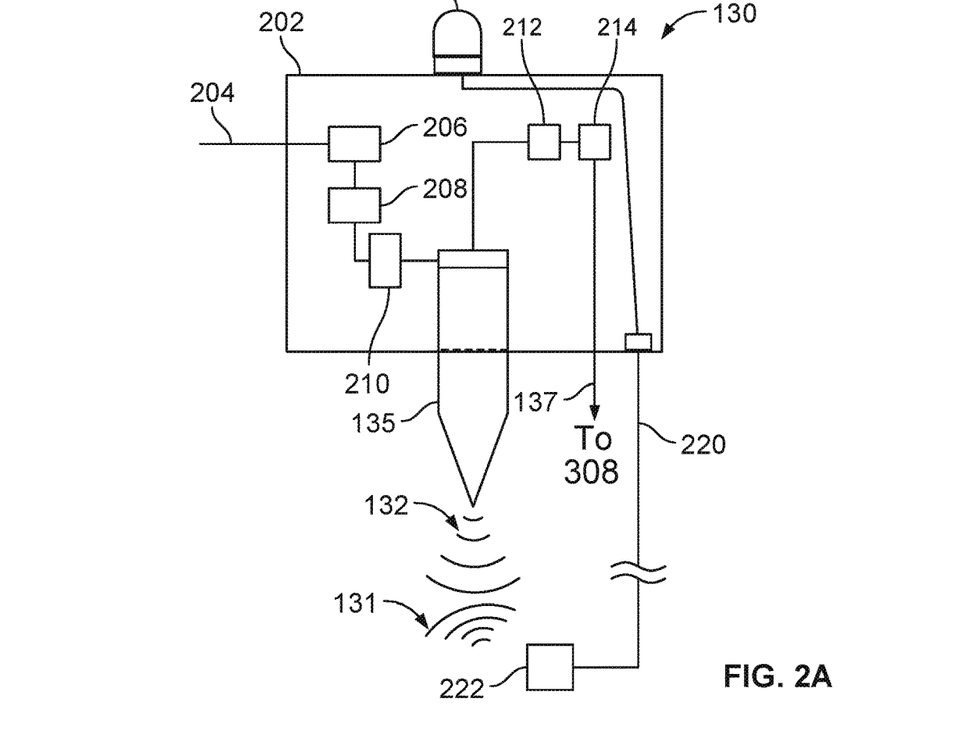
FIGS. 2A-2B illustrate schematic views of an example implementation of a sensor sub-assembly that is part of a hydrocarbon fluid recovery system.
Figure 2B:
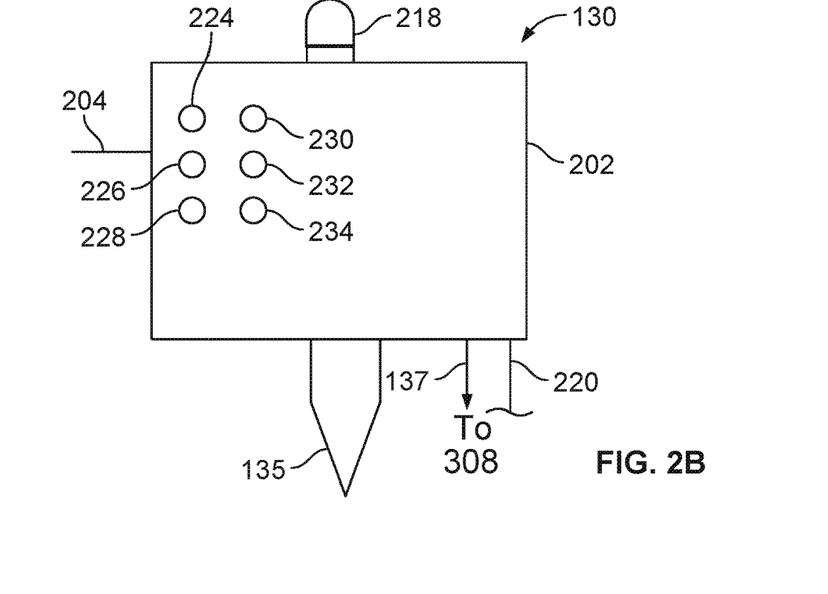

FIGS. 2A-2B illustrate schematic views of an example implementation of the sensor sub-assembly 130 that is part of the hydrocarbon fluid recovery system 100. The illustrated sensor assembly 130 includes a housing 202 that at least partially encloses the sensor antenna 135. As illustrated, a portion of the sensor antenna 135 (e.g., that transmits and receives wave energy as previously described) extends from the housing 202. A power input 204 is connected through the housing 202, and through one or more circuit breakers 206, to a power supply 208. For example, in some aspects, the power input 204 is an AC power input, such as 120 VAC (or 115 VAC) power. The power supply 208, in some aspects, may be a DC power supply (e.g., that receives the AC power and converts the AC power to DC power at 24 VDC).

The illustrated power supply 208 provides DC power to the sensor antenna 135 through, for example, one or more fuses 210. As shown in FIG. 2A, an output from the sensor antenna 135 is provided to a signal converter 212. For example, the sensor antenna 135, as described previously, may determine relative levels within the waste container 105 of each of the hydrocarbon fluid 115, the non-hydrocarbon fluid 120, and the sludge 125. Based on these relative levels, the sensor antenna 135 may determine a level difference 157 between the hydrocarbon fluid 115 and the non-hydrocarbon fluid 120. In some aspects, as the determined level difference 157 meets or exceeds a particular threshold, the sensor antenna 135 may provide a signal (e.g., 4-20 mA) to the signal converter 212. For example, in some aspects, as the determined level difference 157 is greater than 8 inches (adjustable), the sensor antenna 135 sends the signal to the signal converter 212. In some aspects, the threshold of the determined level distance 157 may be 4 inches.

Further, in some aspects, there may be a lower threshold (e.g., in which the signal is not transmitted by the sensor antenna 135) and an upper threshold (e.g., in which the signal is transmitted by the sensor antenna 135). In such aspects, the sensor antenna 135 may send the 4-20 mA signal to the converter 212 when the upper threshold is exceeded, and stop sending the 4-20 mA signal when the distance 157 is less than the lower threshold.

The illustrated signal converter 212 converts the 4-20 mA signal to a 24 VDC signal that is transmitted to a relay 214. The relay 214 transmits the 24 VDC signal as the control signal 137 to the hydrocarbon fluid pumping assembly 140 to operate the assembly 140 (as explained more fully with reference to FIG. 3).

The illustrated implementation of the sensor assembly 130 also includes a warning signal 218 (e.g., light, siren, or both) that is mounted to the housing 202, e.g., for visibility.

In this example implementation, the warning signal 218 is connected to a high level float switch 222 through a wired connection 220. Although not shown in FIG. 1, the high level float switch 222 may be positioned to float on the top level of the hydrocarbon fluid 115 in the waste fluid container 105. If the top level of the hydrocarbon fluid 115 exceeds a particular height (adjustable) in the container 105, the float switch 222 may signal the warning signal 218 to activate, e.g., to inform an operator that there may be a problem or malfunction with the sensor assembly 130, the hydrocarbon fluid pumping assembly 140, or both.

As shown in FIG. 2B, the sensor assembly 130 may also include one or more components mounted to or through the housing 202. For example, the illustrated sensor assembly 130 includes an emergency stop button 224, a power on button 226, and an automatic/manual switch 228. The emergency stop button 224, when activated, may cease all operations of one or more of the sensor assembly 130, the hydrocarbon fluid pumping assembly 140, the sludge pumping assembly 160, or the non-hydrocarbon fluid pumping assembly 185. The power on button 226 may begin normal operation capability to one or more of the sensor assembly 130, the hydrocarbon fluid pumping assembly 140, the sludge pumping assembly 160, or the non-hydrocarbon fluid pumping assembly 185.

The automatic/manual switch 228 may allow an operator of the hydrocarbon fluid recovery system 100 to select between automatic operation or manual operation of one or more of the sensor assembly 130, the hydrocarbon fluid pumping assembly 140, the sludge pumping assembly 160, or the non-hydrocarbon fluid pumping assembly 185. As further shown in FIG. 2B, the illustrated sensor assembly 130 includes a power on light 230 (that indicates when the power on button 226 has been activated), an auto light 232 (that indicates that an automatic mode has been selected with the switch 228), and a manual light 234 (that indicates that a manual mode has been selected with the switch 228).

Figure 3:
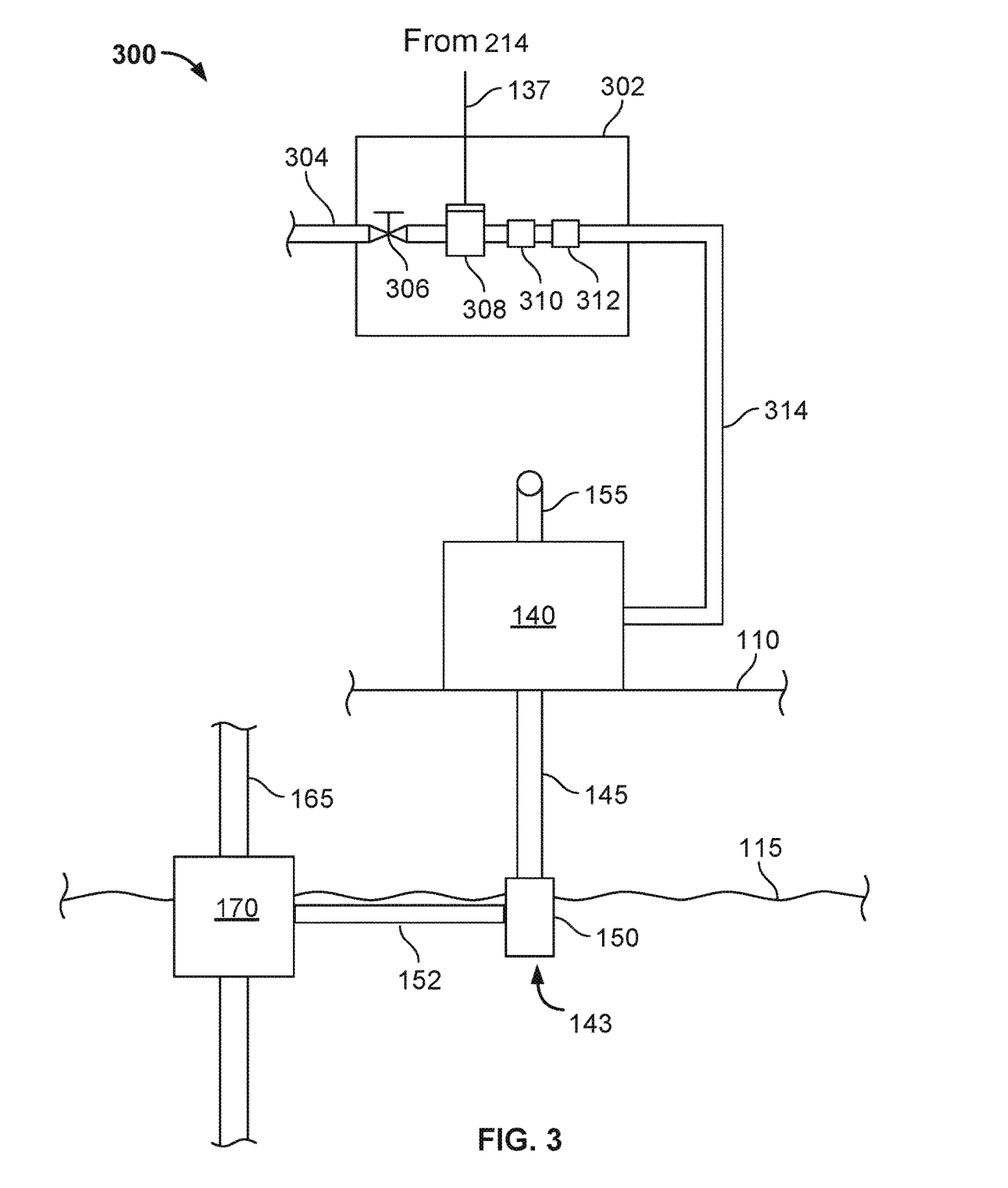
FIG. 3 illustrates a schematic view of an example implementation of a hydrocarbon fluid pumping assembly that is part of a hydrocarbon fluid recovery system.

FIG. 3 illustrates a schematic view of an example implementation of the hydrocarbon fluid pumping assembly 140 that is part of the hydrocarbon fluid recovery system 100. In this example implementation of the assembly 140, a pumping control 302 is coupled to the pumping assembly 140 (e.g., a diaphragm pump), which is operated by a control hydraulic supply (e.g., air supply). As illustrated, a hydraulic fluid supply 304 is connected to a manual shut-off valve 306 of the pumping control 302. The valve 306 may be manually operated to control the hydraulic fluid supply 304 to a solenoid valve 308. The solenoid valve 308, as shown, receives the control signal 137 from the sensor assembly 130. Based on the control signal 137, the solenoid valve 308 may be operated to allow the hydraulic fluid supply 304 to circulate through a water separator 310, an oiler 312, and through conduit 314 to the hydrocarbon fluid pumping assembly 140. Upon receipt of the hydraulic fluid supply 304, the hydrocarbon fluid pumping assembly 140 may operate (e.g., turn on) to circulate a flow 143 of hydrocarbon fluid 115 through the strainer 150, through the inlet conduit 145, and through the outlet conduit 155 (e.g., for storage in another tank or container or for placement in a pipeline).

Figure 4:
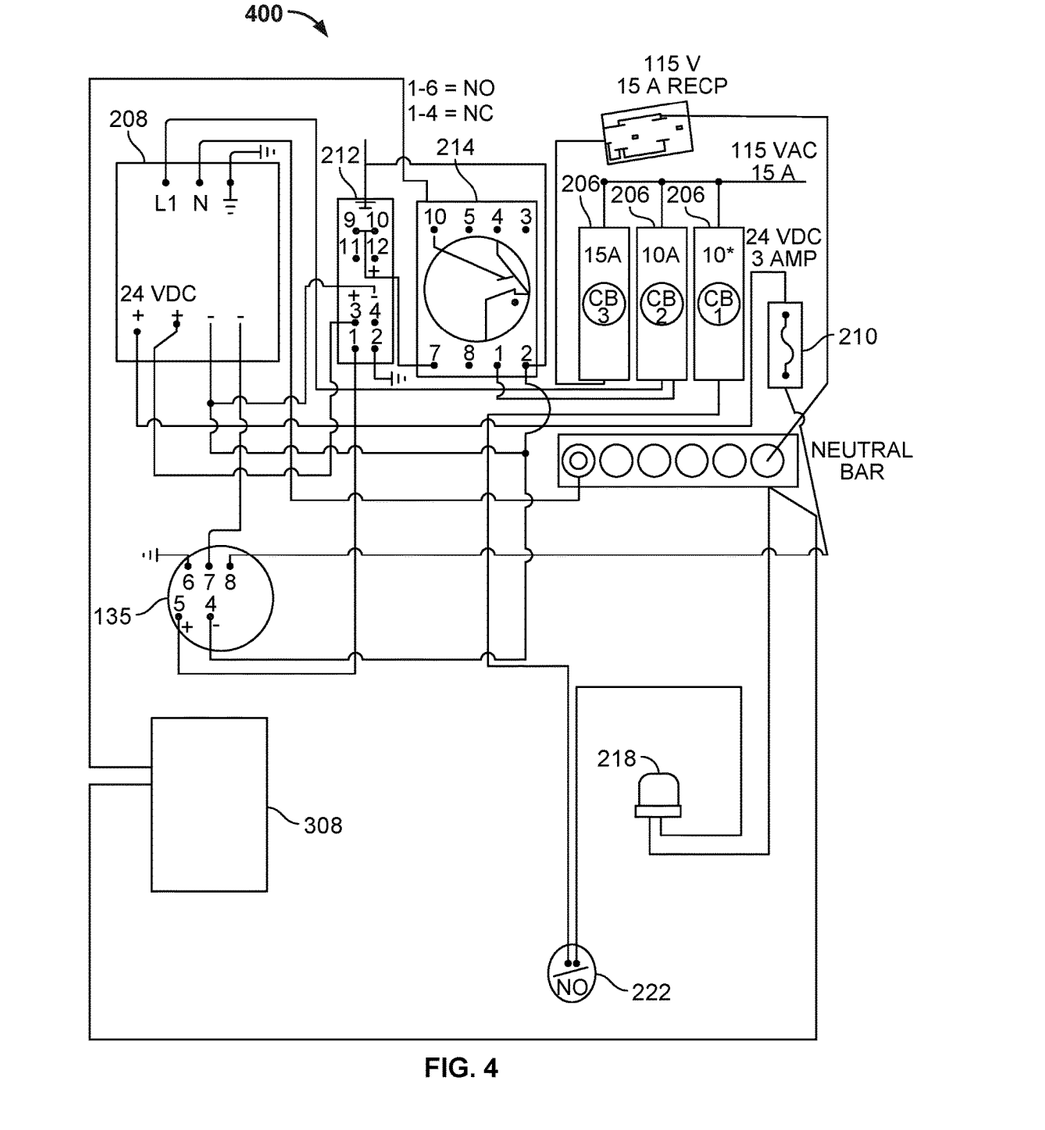
FIG. 4 illustrates a circuit diagram of an example implementation of an electrical system of a portion of a hydrocarbon fluid recovery system.

FIG. 4 illustrates a circuit diagram 400 of an example implementation of an electrical system of a portion of the hydrocarbon fluid recovery system 100. For example, as illustrated in this example, 115 VAC power is provided through circuit breakers 206, to the DC power supply 208, which outputs 24 VDC power. The output 24 VDC power is connected, through the fuse 210, to, for example, the sensor antenna 135, the signal converter 212, the warning signal 218, and the solenoid valve 308. As shown in this example, 115 VAC power is provided to the relay 214 and the high level float switch 222 for operation. In addition, in this example, 115 VAC power is provided through a circuit breaker 206 to power a 115 V convenience receptacle.

Figure 5:
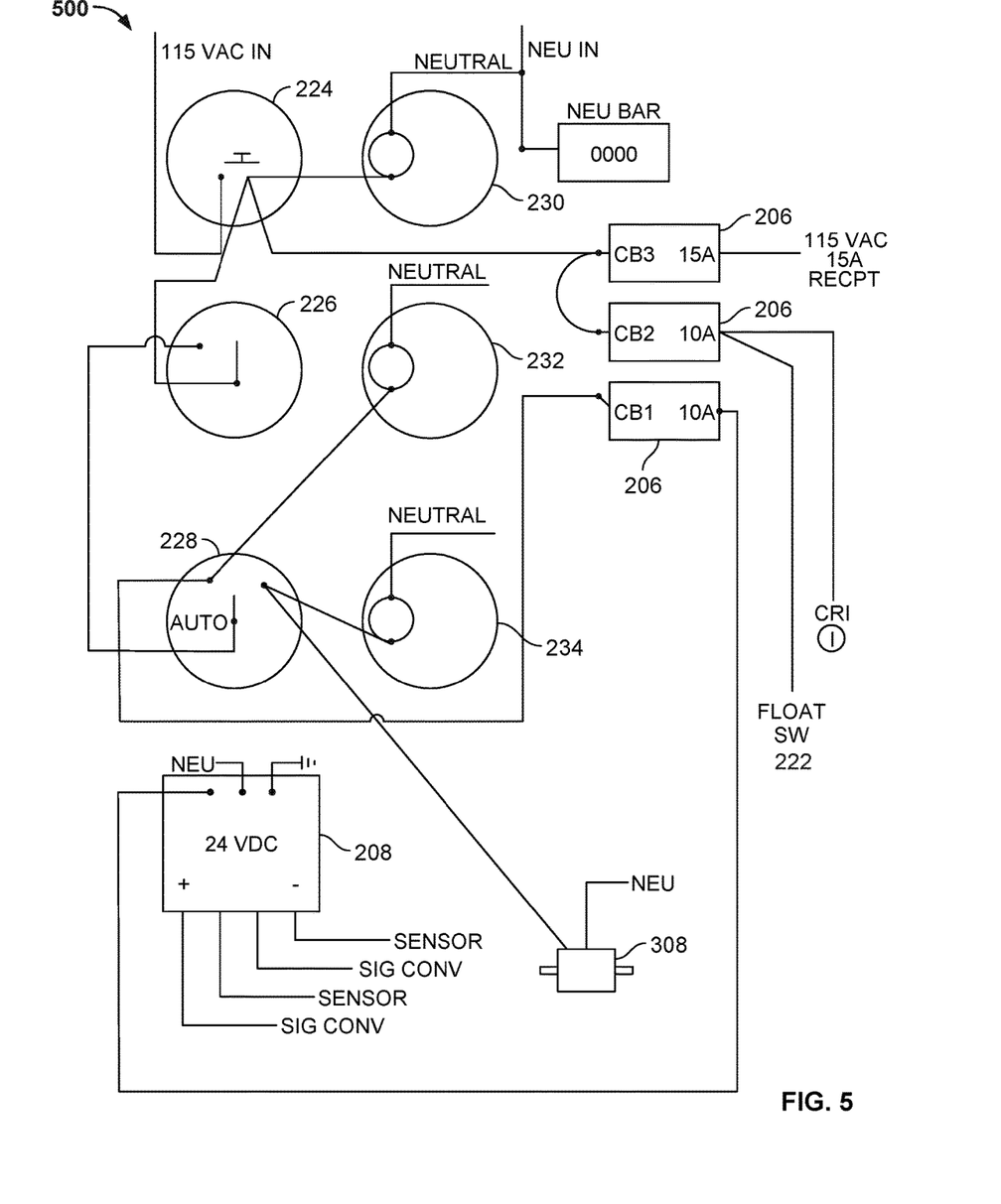
FIG. 5 illustrates another circuit diagram of an example implementation of an electrical system of a portion of a hydrocarbon fluid recovery system.

FIG. 5 illustrates another circuit diagram 500 of an example implementation of an electrical system of a portion of the hydrocarbon fluid recovery system 100. As shown in this figure, the emergency stop button 224, the power on button 226, and the auto/manual switch 228, as well as the power on light 230, auto on light 232, and manual on light 234, are powered by the 115 VAC power supply, which is then provided to the circuit breakers 206. As further illustrated, the auto/manual switch 228 is wired to supply power to the appropriate light—auto on light 232 or manual on light 234—depending on the position of the switch 228. Further, based on the switch 228 being in "auto," a signal is sent to the solenoid valve 308 to operate in automatic mode (e.g., operation based on receipt of the control signal 137).

Figure 6:
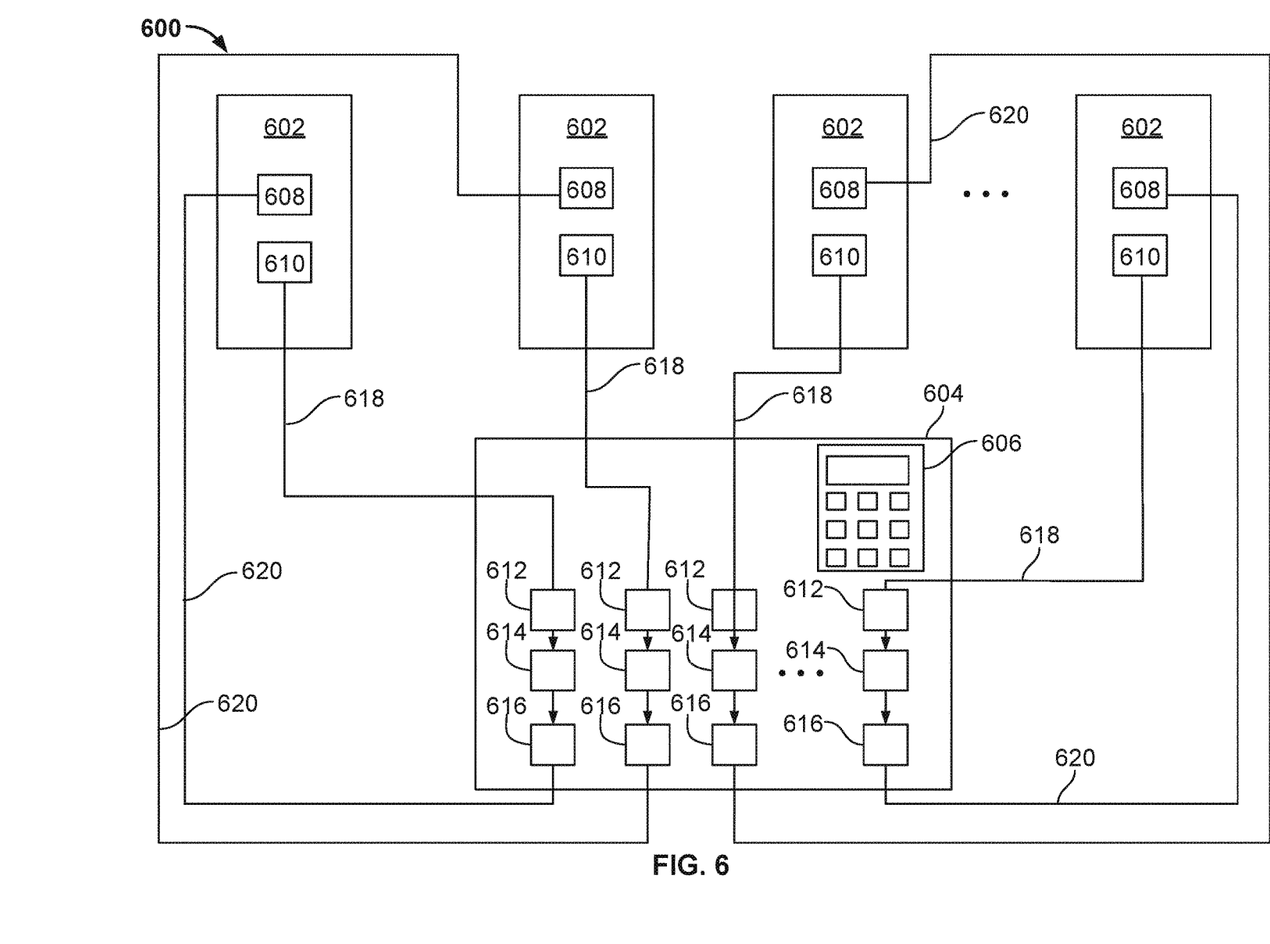
FIG. 6 illustrates a schematic view of another example implementation of a hydrocarbon fluid recovery system.

FIG. 6 illustrates a schematic view of another example implementation of a hydrocarbon fluid recovery system 600. In this example implementation, the hydrocarbon fluid recovery system 600 includes multiple (e.g., 4 are shown but fewer or more are contemplated by the present disclosure) sensor assemblies 610 and hydrocarbon fluid pumping assemblies 608, which are mounted on or at respective waste fluid containers 602, and are connected to a main control system 604. In some aspects, each sensor assembly 610 may include a sensor antenna (e.g., antenna 135), that sends a control signal 618 (e.g., based on a level difference 157 between a hydrocarbon fluid and non-hydrocarbon fluid in the container 602) to a particular signal converter 612 (of many signal converters 612) in the main control system 604. The particular signal converter 612 sends a converted signal (e.g., from 4-20 mA to 24 VDC) to a particular signal relay 614 (of many signal relays 614) in the main control system 604. The particular signal relay 614 sends the converted signal (e.g., control signal 137) to a particular solenoid valve 616 (of many solenoid valves 616) in the main control system 604. The particular solenoid valve 616 may then, based on the converted signal, operate to provide a hydraulic fluid supply 620 back to the hydrocarbon fluid pumping assembly 608 that is paired with the sensor assembly 608 that originated the control signal. Based on receipt of the hydraulic fluid supply 620, the hydrocarbon fluid pumping assembly 608 may operate (e.g., turn on) to remove hydrocarbon fluid from the container 602. Additional components of the system 600 (e.g., power supplies, power inputs, conduits, floats, and otherwise), which are described with reference to FIGS. 1, 2A-2B, 3, 4, and 5, are not illustrated in FIG. 6 for simplicity.

Operations of the main control system 604, which may control operation of the aforementioned components of system 600, may be performed by or with a controller 606, which may include memory, processor(s), an input and a display, as well as other components. For example, the controller 606 can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Figure 7:
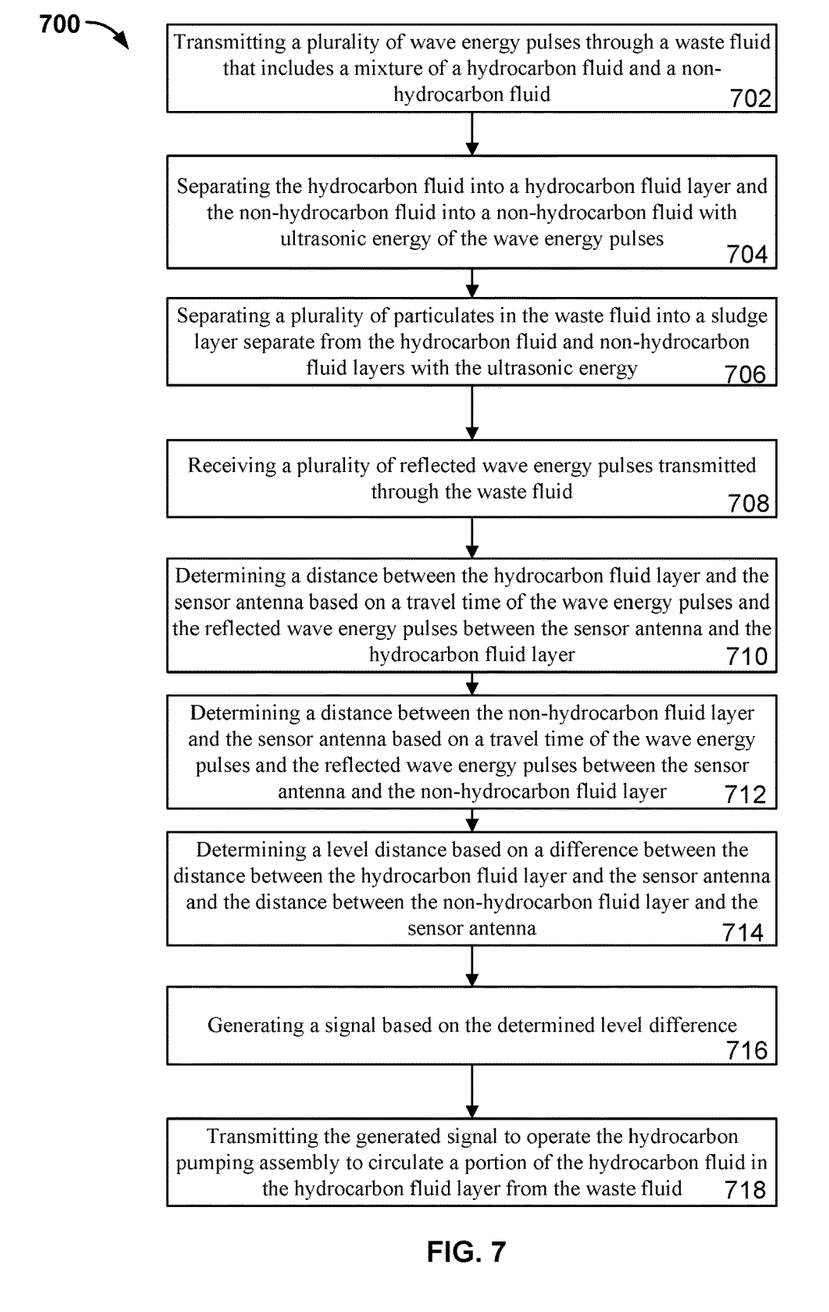
FIG. 7 illustrates a flowchart for a method for recovering a hydrocarbon fluid.

FIG. 7 illustrates a flowchart for a method 700 for recovering a hydrocarbon fluid. In some aspects, the method 700 may be performed with all or a portion of the hydrocarbon fluid recovery system 100, or another hydrocarbon fluid recovery system according to the present disclosure. Method 700 may illustrate one example implementation of a method for recovering a hydrocarbon fluid. Other methods for recovering a hydrocarbon fluid according to the present disclosure may include different steps, fewer steps, additional steps, or may proceed in a different order of steps as compared to method 700. Implementations of method 700 may include one or more of the described steps performed serially or in parallel.

Method 700 may begin at step 702, which includes transmitting a plurality of wave energy pulses through a waste fluid that includes a mixture of a hydrocarbon fluid and a non-hydrocarbon fluid. In some aspects, the waste fluid is a hydraulic fracturing fluid that has previously been used in a hydraulic fracturing operation and is now stored in a waste fluid container (e.g., fracturing fluid disposal tank or pond or otherwise). In some aspects, the hydrocarbon fluid is oil and the non-hydrocarbon fluid is water or water plus fracturing fluid additives. In some aspects, the plurality of wave energy pulses may be a radar signal that includes ultrasonic energy and electromagnetic energy.

Method 700 may continue at step 704, which includes separating the hydrocarbon fluid into a hydrocarbon fluid layer and the non-hydrocarbon fluid into a non-hydrocarbon fluid with ultrasonic energy of the wave energy pulses. For example, the ultrasonic energy may agitate the waste fluid, thereby further separating (e.g., in addition to relative differences in density and/or specific gravity of the fluids in the waste fluid) the hydrocarbon fluid and the non-hydrocarbon fluid into separate (e.g., stratified) layers.

Method 700 may continue at step 706, which includes separating a plurality of particulates in the waste fluid into a sludge layer separate from the hydrocarbon fluid and non-hydrocarbon fluid layers with the ultrasonic energy. For example, in some aspects, the waste fluid may include particulates (e.g., sand, rock bits, heavy metals, and otherwise) as well as chemicals separate from water in the non-hydrocarbon fluid. The ultrasonic energy may further agitate the waste fluid, thereby further separating the particulates and other chemicals into a sludge layer that is separate from the hydrocarbon fluid and the non-hydrocarbon fluid layers.

Method 700 may continue at step 708, which includes receiving a plurality of reflected wave energy pulses transmitted through the waste fluid. For example, as the electromagnetic energy passes through the waste fluid, the energy reflects back toward, e.g., a sensor antenna of a sensor assembly, that transmits the plurality of wave energy pulses in step 702. Thus, a travel time of the transmitted pulses and reflected pulses in a round trip that starts and ends at the sensor antenna depends on the particular substance (e.g., hydrocarbon fluid layer, non-hydrocarbon fluid layer, sludge layer) impacted by the electromagnetic energy in the pulses. For example, the further the distance between the sensor antenna and the impacted layer (e.g., within the waste fluid container), the greater the travel time.

Method 700 may continue at step 710, which includes determining a distance between the hydrocarbon fluid layer and the sensor antenna based on a travel time of the wave energy pulses and the reflected wave energy pulses between the sensor antenna and the hydrocarbon fluid layer. For example, the sensor assembly may determine a distance between the hydrocarbon fluid layer and the antenna based on a known speed of the wave pulses and half of the determined travel time to a surface of the hydrocarbon fluid layer.

Method 700 may continue at step 712, which includes determining a distance between the non-hydrocarbon fluid layer and the sensor antenna based on a travel time of the wave energy pulses and the reflected wave energy pulses between the sensor antenna and the non-hydrocarbon fluid layer. For example, the sensor assembly may determine a distance between the non-hydrocarbon fluid layer and the antenna based on a known speed of the wave pulses and half of the determined travel time to a surface of the non-hydrocarbon fluid layer.

In some aspects, the sensor assembly may distinguish or determine a particular content of the layer that is the determined distance away from the sensor antenna. For example, the sensor assembly may determine, based on known differences in densities between the multiple fluid layers (e.g., hydrocarbon fluid, non-hydrocarbon fluid, sludge/particulates) in the waste fluid container, that a top layer (e.g., layer closest to the antenna) is, for example, hydrocarbon fluid. The sensor assembly may also determine, e.g., based on known density differences, that a middle layer (e.g., next closest layer to the antenna) is a non-hydrocarbon fluid (e.g., water) layer. The sensor assembly may also determine, e.g., based on known density differences, that a bottom layer (e.g., layer furthest from the antenna) is a sludge/particulate (e.g., sand, metals, other solids) layer. In some aspects, the sensor assembly may be programmed or set with the known densities (as well as known content layers) based on, e.g., tests conducted in the waste fluid container (e.g., with a thief or otherwise).

Method 700 may continue at step 714, which includes determining a level distance based on a difference between the distance between the hydrocarbon fluid layer and the sensor antenna and the distance between the non-hydrocarbon fluid layer and the sensor antenna. For example, once the distances between the antenna and the surface of the hydrocarbon fluid layer, and the antenna and the surface of the non-hydrocarbon fluid layer, are known, a distance differential between the hydrocarbon fluid layer and non-hydrocarbon fluid layer may be determined.

Method 700 may continue at step 716, which includes generating a signal based on the determined level difference. For example, in some aspects, there may be a predetermined threshold level difference (adjustable), e.g., 4-8 inches or otherwise. Once the determined level difference meets this threshold, the sensor assembly may generate the signal (e.g., a 4-20 mA signal converted to a 24 VDC signal).

Method 700 may continue at step 718, which includes transmitting the generated signal to operate the hydrocarbon pumping assembly to circulate a portion of the hydrocarbon fluid in the hydrocarbon fluid layer from the waste fluid. For example, the generated signal may be transmitted from the sensor assembly to the hydrocarbon fluid pumping assembly (e.g., a diaphragm pump). The transmitted signal may, for example, operate a valve to open to supply a control fluid (e.g., air) to the diaphragm pump to turn on. As the diaphragm pump turns on, hydrocarbon fluid in the hydrocarbon fluid layer is circulated from the waste fluid container independent of non-hydrocarbon fluid (e.g., water or chemicals) and particulates.

A number of embodiments have been described. Nevertheless, it will be understood that various modifications may be made without departing from the spirit and scope of what is described. Accordingly, other embodiments are within the scope of the following claims.

What is claimed is:

1. A hydrocarbon recovery system, comprising:
a sensor assembly comprising a sensor antenna configured to transmit a plurality of wave energy pulses of ultrasonic energy and electromagnetic energy through a waste fluid in a direction away from the sensor antenna, the waste fluid comprising a mixture of a hydrocarbon fluid and a non-hydrocarbon fluid in a hydraulic fracturing fluid recovered from a hydraulic fracturing operation, the sensor assembly configured to stratify the waste fluid into the hydrocarbon fluid in a hydrocarbon fluid layer and into the non-hydrocarbon fluid in a non-hydrocarbon fluid layer based on transmitting the plurality of wave energy pulses through the waste fluid at a first wavelength that reflects back from a first interfacial surface of the hydrocarbon fluid layer toward a top surface of the waste fluid and a second wavelength that reflects back from a second interfacial surface of the non-hydrocarbon fluid layer toward the top surface of the waste fluid, such that the hydrocarbon fluid layer and the non-hydrocarbon fluid layer are further separated, the sensor antenna further configured to receive a plurality of reflected wave energy pulses transmitted through the waste fluid in a direction toward the sensor antenna, the sensor assembly further configured to determine a level difference between the first interfacial surface of the hydrocarbon fluid layer that comprises the hydrocarbon fluid and the second interfacial surface of the non-hydrocarbon fluid layer that comprises the non-hydrocarbon fluid based, at least in part, on the plurality of reflected wave energy pulses, and generate a signal based on the determined level difference; and
a hydrocarbon fluid pumping assembly communicably coupled to the sensor assembly to receive the generated signal, the hydrocarbon fluid pumping assembly configured to operate, based at least in part on the generated signal, to circulate a portion of the hydrocarbon fluid in the hydrocarbon fluid layer from the waste fluid.

2. The hydrocarbon recovery system of claim 1, wherein the sensor antenna comprises a radar rod antenna.

3. The hydrocarbon recovery system of claim 2, wherein the radar rod antenna is configured to transmit the ultrasonic energy and electromagnetic energy through the plurality of wave energy pulses and into the waste fluid to at least partially separate the hydrocarbon fluid into the hydrocarbon fluid layer and the non-hydrocarbon fluid into the non-hydrocarbon fluid layer of the waste fluid.

4. The hydrocarbon recovery system of claim 3, wherein the radar rod antenna is further configured to transmit the ultrasonic energy and electromagnetic energy through the plurality of wave energy pulses and into the waste fluid to at least partially separate a plurality of particulates in the waste fluid into a sludge layer separate from the hydrocarbon fluid and non-hydrocarbon fluid layers.

5. The hydrocarbon recovery system of claim 1, wherein the sensor assembly is configured to determine: (i) a distance between the first interfacial surface of the hydrocarbon fluid layer and the sensor antenna based, at least in part, on a travel time of the plurality of wave energy pulses and the plurality of reflected wave energy pulses between the sensor antenna and the first interfacial surface of the hydrocarbon fluid layer, and (ii) a distance between the second interfacial surface of the non-hydrocarbon fluid layer and the sensor antenna based, at least in part, on a travel time of the plurality of wave energy pulses and the plurality of reflected wave energy pulses between the sensor antenna and the second interfacial surface of the non-hydrocarbon fluid layer.

6. The hydrocarbon recovery system of claim 5, wherein the sensor assembly is further configured to determine the level distance based at least in part on a difference between the distance between the first interfacial surface of the hydrocarbon fluid layer and the sensor antenna and the distance between the second interfacial surface of the non-hydrocarbon fluid layer and the sensor antenna.

7. The hydrocarbon recovery system of claim 1, wherein the sensor assembly is further configured to generate the signal based on the determined level difference exceeding a threshold level difference.

8. The hydrocarbon recovery system of claim 1, wherein the hydrocarbon fluid pumping assembly comprises a diaphragm pump positionable to circulate the portion of the hydrocarbon fluid in the hydrocarbon fluid layer from the waste fluid based at least in part on the generated signal from the sensor assembly.

9. The hydrocarbon recovery system of claim 1, wherein the hydrocarbon fluid pumping assembly comprises:
an inlet conduit that includes an inlet submergible in the hydrocarbon fluid layer;
a strainer positioned on the inlet to filter one or more particulates from hydrocarbon fluid in the hydrocarbon fluid layer; and
a float coupled to the strainer and configured to ride on the surface of the hydrocarbon fluid layer to maintain a position of the inlet within the hydrocarbon fluid layer.

10. The hydrocarbon recovery system of claim 1, wherein the hydrocarbon fluid comprises oil and the non-hydrocarbon fluid comprises water.

11. The hydrocarbon recovery system of claim 10, wherein the portion of the hydrocarbon fluid comprises oil that includes 1% or less of water by volume.

12. The hydrocarbon recovery system of claim 6, wherein the sensor assembly is further configured to generate the signal based on the determined level difference exceeding a threshold level difference.

13. The hydrocarbon recovery system of claim 12, wherein the hydrocarbon fluid pumping assembly comprises a diaphragm pump positionable to circulate the portion of the hydrocarbon fluid in the hydrocarbon fluid layer from the waste fluid based at least in part on the generated signal from the sensor assembly.

14. The hydrocarbon recovery system of claim 13, wherein the hydrocarbon fluid pumping assembly comprises:
- an inlet conduit that includes an inlet submergible in the hydrocarbon fluid layer;
- a strainer positioned on the inlet to filter one or more particulates from hydrocarbon fluid in the hydrocarbon fluid layer; and
- a float coupled to the strainer and configured to ride on the surface of the hydrocarbon fluid layer to maintain a position of the inlet within the hydrocarbon fluid layer.

15. The hydrocarbon recovery system of claim 14, wherein the hydrocarbon fluid comprises oil and the non-hydrocarbon fluid comprises water, and the oil includes 1% or less of water by volume.

16. A oil recovery system, comprising:
- a plurality of oil recovery sub-assemblies, each oil recovery sub-assembly comprising:
  - a radar rod antenna configured to transmit a plurality of wave energy pulses through a recovered hydraulic fracturing liquid that comprises a mixture of oil and water and is stored in a recovery tank in a direction away from the radar rod antenna to stratify the hydraulic fracturing liquid into an oil layer and a water layer based on transmitting the plurality of wave energy pulses through the hydraulic fracturing liquid at a first wavelength that reflects back from a first interfacial surface of the oil layer toward a top surface of the hydraulic fracturing liquid and a second wavelength that reflects back from a second interfacial surface of the water layer toward the top surface of the hydraulic fracturing liquid such that the oil layer and the water layer are further separated, the radar rod antenna further configured to receive a plurality of reflected wave energy pulses transmitted through the recovered hydraulic fracturing liquid in a direction toward the radar rod antenna; and
  - a pumping assembly positioned to circulate a portion of the oil from the recovered hydraulic fracturing liquid; and
- a control system communicably coupled to each of the plurality of oil recovery sub-assemblies, the control system configured to perform, for each of the plurality of oil recovery sub-assemblies, operations comprising:
  - determining, based on the plurality of wave energy pulses and the plurality of reflected wave energy pulses, a level difference between the first interfacial surface of the oil layer that comprises the oil and the second interfacial surface of the water layer that comprises the water; and
  - controlling the pumping assembly to circulate the portion of the oil from the recovered hydraulic fracturing liquid based on the determined level difference.

17. The oil recovery system of claim 16, wherein the plurality of wave energy pulses comprise ultrasonic energy and electromagnetic energy.

18. The oil recovery system of claim 17, wherein the radar rod antenna is further configured to transmit the ultrasonic and electromagnetic energy through the plurality of wave energy pulses and into the recovered hydraulic fracturing liquid to at least partially separate a plurality of particulates of the recovered hydraulic fracturing fluid into a sludge layer separate from the oil and water layers.

19. The oil recovery system of claim 18, wherein the control system is further configured to, for each of the plurality of oil recovery sub-assemblies, perform operations comprising:
- determining a distance between the first interfacial surface of the oil layer and the radar rod antenna based, at least in part, on a travel time of the plurality of wave energy pulses and the plurality of reflected wave energy pulses between the radar rod antenna and the first interfacial surface of the oil layer; and
- determining a distance between the second interfacial surface of the water layer and the radar rod antenna based, at least in part, on a travel time of the plurality of wave energy pulses and the plurality of reflected wave energy pulses between the radar rod antenna and the second interfacial surface of the water layer.

20. The oil recovery system of claim 19, wherein the portion of the oil comprises oil that includes 1% or less of water by volume.

* * * * *